United States Patent
John et al.

(10) Patent No.: US 7,938,037 B2
(45) Date of Patent: May 10, 2011

(54) GEAR BOX ARRANGEMENT WITH A GEAR-SHIFTING ELEMENT SAFETY DEVICE FOR PREVENTING THE ENGAGEMENT OF MULTIPLE GEARS OF A GEARBOX

(75) Inventors: Thomas John, Alitzheim (DE); Dieter Kraxner, Wurmberg (DE)

(73) Assignees: ZF Friedrichshafen AG, Friedrichshafen (DE); Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 801 days.

(21) Appl. No.: 11/630,712

(22) PCT Filed: Jun. 17, 2005

(86) PCT No.: PCT/EP2005/006505
§ 371 (c)(1),
(2), (4) Date: Dec. 31, 2007

(87) PCT Pub. No.: WO2006/000338
PCT Pub. Date: Jan. 5, 2006

(65) Prior Publication Data
US 2008/0127760 A1    Jun. 5, 2008

(30) Foreign Application Priority Data
Jun. 26, 2004   (DE) .......................... 10 2004 031 021

(51) Int. Cl.
*F16H 59/00* (2006.01)
(52) U.S. Cl. .......................................... 74/335; 477/130
(58) Field of Classification Search .................. 477/127, 477/130, 131, 138, 156, 159; 74/335
See application file for complete search history.

(56) References Cited

U.S. PATENT DOCUMENTS

| | | | |
|---|---|---|---|
| 1,434,643 A | 11/1922 | Woolson |
| 1,601,048 A | 9/1926 | Sponable |
| 2,510,697 A | 6/1950 | Jacoby |
| 2,953,035 A | 9/1960 | Herr |
| 3,301,078 A | 1/1967 | Michael |

(Continued)

FOREIGN PATENT DOCUMENTS
DE                293146           7/1916
(Continued)

*Primary Examiner* — Ha D. Ho
(74) *Attorney, Agent, or Firm* — Cohen Pontani Lieberman & Pavane LLP

(57) ABSTRACT

A gearbox arrangement for a drive train of a motor vehicle, such as a double clutch gearbox arrangement or a power shift gearbox arrangement, has at least one group of gear-shifting elements (1, 2) which can be actuated for engaging and disengaging at least one respective gear of the gearbox arrangement in that they are moved relative to a gearbox housing between at least one neutral position, in which no gear associated with the gear-shifting element is engaged, and at least one engaged-gear position, in which a gear associated with the gear-shifting element and the engaged-gear position is engaged. The arrangement according to the invention is characterised by at least one safety device (210) associated with the gear-shifting elements or with a group of gear-shifting elements, which takes a release position when all the gear-shifting elements are in their neutral position, and which can be moved from the release position to a safety position when one of the gear-shifting elements is moved into one of the engaged-gear positions, the safety device preventing the other gear-shifting elements from moving from their neutral position to an engaged-gear position.

29 Claims, 9 Drawing Sheets

U.S. PATENT DOCUMENTS

| | | | |
|---|---|---|---|
| 4,068,537 A | 1/1978 | Wolfe | |
| 4,911,031 A * | 3/1990 | Yoshimura et al. | 74/335 |
| 5,832,777 A * | 11/1998 | Weilant | 74/335 |
| 6,131,476 A * | 10/2000 | Miyazaki | 74/335 |
| 6,722,219 B2 * | 4/2004 | Berger et al. | 74/335 |
| 6,785,599 B2 * | 8/2004 | Berger et al. | 701/51 |
| 7,444,896 B2 * | 11/2008 | Schepperle | 74/335 |

FOREIGN PATENT DOCUMENTS

| | | |
|---|---|---|
| DE | 1 848 097 | 3/1962 |
| DE | 1 530 602 | 7/1969 |
| DE | 2 132 736 | 1/1973 |
| DE | 81 22 318 | 7/1981 |
| DE | G 81 22 318 | 7/1981 |
| DE | 198 53 584 | 2/2000 |
| DE | 199 20 440 | 11/2000 |
| DE | 103 16 215 | 6/2004 |
| DE | 103 47 203 | 6/2004 |
| EP | 0 305 750 | 3/1989 |
| EP | 0 748 966 | 12/1996 |
| FR | 1 456 723 | 8/1965 |
| GB | 9947 | 11/1911 |
| GB | 114712 | 4/1918 |

* cited by examiner a)

b)

a)

b)

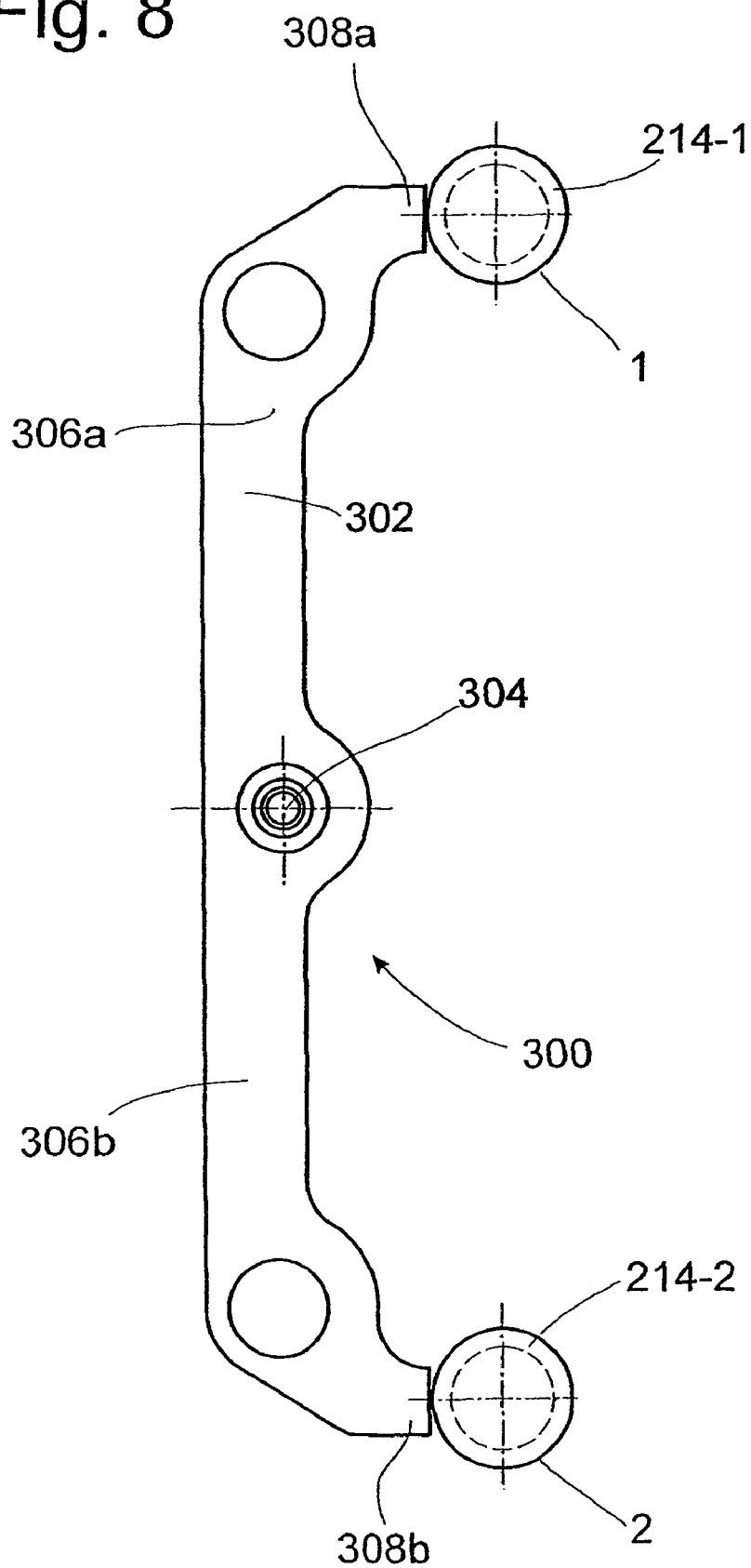

GEAR BOX ARRANGEMENT WITH A GEAR-SHIFTING ELEMENT SAFETY DEVICE FOR PREVENTING THE ENGAGEMENT OF MULTIPLE GEARS OF A GEARBOX

CROSS REFERENCE TO RELATED APPLICATIONS

This is a U.S. national stage of application No. PCT/EP2005/006505, filed on Jun. 17, 2005. Priority is claimed on the following application: Country: Germany, Application No.: 10 2004 031 021.1, Filed: Jun. 26, 2004.

BACKGROUND OF THE INVENTION

The invention pertains to a gearbox arrangement for the power train of a motor vehicle, possibly to a dual-clutch gearbox arrangement or to a power-shift gearbox arrangement, with at least one group of gear-shifting elements, each of which can be actuated to engage and to disengage at least one individual gear of the gearbox arrangement by moving, relative to a gearbox arrangement housing, between at least one neutral position, in which no gear assigned to the gear-shifting element is engaged, and at least one gear-engaged position, in which a gear assigned to the gear-shifting element and to the gear-engaged position is engaged. In this context, we are thinking primarily but not exclusively about so-called dual-clutch gearboxes or power-shift gearboxes, which have two gear trains which can be shifted independently of each other, each gear train having its own input shaft, to which a clutch arrangement (such as a wet-running clutch of the plate type or a dry-running clutch of the friction disk type) of a dual clutch is assigned so as to allow shifting between a gear of the one gear train to a gear of the other gear train without any interruption in the tractive force.

A dual-clutch gearbox can in principle be considered a parallel circuit of two fully functional gearboxes, each of which forms one of the two gear trains of the dual-clutch gearbox. The engine torque is distributed by the two clutches (two clutch arrangements) between the gear trains, where the one gear train takes care of shifting the even gears, while the other gear train takes care of shifting the odd gears. So that shifting from one gear to another can be accomplished without any interruption in the tractive force, one gear must be engaged in each gear train while the clutch torque is passed from the one gear train to the other.

The invention also pertains, however, to simple gear-shift mechanisms in which shifting gears always means an interruption in the tractive force.

To provide a corresponding vehicle with sports car-like driving behavior and to make it possible for the driver to respond rapidly to hazardous driving situations, it is desirable to realize, at least optionally, short shifting times for switching the gearbox arrangement between different gears. To prevent two gears assigned to the same gearbox input shaft from being engaged simultaneously by mistake, which could destroy the gearbox arrangement, the shifting forces required to shift gears must, under the conventional approach, be applied to the gear-shifting elements in a coordinated manner so that two of these gears cannot be engaged simultaneously. This means that, to ensure that no shifting errors can occur, the gear-shift time cannot be reduced below a certain minimum value. Nor is it excluded that an occurring defect, such as a defect in the actuator arrangement or in the control unit which drives the actuator, could cause the error of simultaneous engagement of two gears assigned to the same gearbox input shaft, leading to the corresponding negative effects on the gearbox and also to an endangerment regarding the driving safety of the vehicle.

In the case of a dual-clutch gearbox, especially upshifting and downshifting by more than one gear are time-critical where the starting gear and the target gear are both assigned to the same gear train and the torque must therefore be re-routed temporarily via the other gear train. If it is important to shift without any interruption in the tractive force during these multi-gear shifts, there must be at least two phases, during each of which two gears, one in each gear train, are engaged simultaneously. Between the two phases, it is necessary to disengage one gear and to engage another one as quickly as possible in the same gear train.

An object of the present invention is to provide gearbox arrangement in which the danger of incorrect shifting such that two or more gears are simultaneously engaged, which should not or must not be engaged simultaneously, is at least reduced. Another object of the present invention is to provide a gearbox arrangement which allows very short gear-shift times.

According to an embodiment of the invention, at least one locking device is provided with the gearbox arrangement, which is assigned jointly to all the gear-shifting elements of the group or of one of the groups, which is in a releasing state when all of the gear-shifting elements are in their neutral positions, and which can be moved from the releasing state to the locking state by the movement of one of the gear-shifting elements into the gear-engaged position or into one such position, wherein the locking device, when in the locking position, prevents the other gear-shifting element or all the other gear-shifting elements from moving out of the neutral position into the gear-engaged position or into one such position.

The locking device opposes the incorrect movement of the other or of all the other gear-shifting elements from the neutral position into the gear-engaged position or into one such position when one of the gear-shifting elements is located in the gear-engaged position. Thus the danger of incorrect shifting, as discussed above, is at least greatly reduced if not eliminated entirely. For this reason, short shifting times are possible indirectly, because the specific coordination of the shifting forces to be applied to shift gears is no longer of any particular importance.

It is advantageous for the locking device, when it is in the releasing state, to allow the assigned gear-shifting elements to move out of the neutral position and into the gear-engaged position or into one such position. It is proposed in particular that the locking device, when in the releasing state, allows the assigned gear-shifting elements to move out of the neutral position into the gear-engaged position or into one such position in such a way that only one of the gear-shifting elements can move into the gear-engaged position or into one such position.

An especially preferred embodiment is characterized in that, when the locking device is in the locking state, the other or all of the other gear-shifting elements are held, preferably locked, to prevent them from moving out of the neutral position into the gear-engaged position or into one such position, when subjected to a given maximum actuating force in this context, we are thinking in particular of a mechanical, positive type of interlock.

It is highly advisable for the locking device, when it is in the releasing state, to prevent the assigned gear-shifting elements from moving out of the neutral position into the gear-engaged position or into one such position on the basis of an actuating force which is less than a certain minimum actuating force. In this context, it is proposed by way of elaboration that, when the locking device is in the releasing state, all of the assigned gear-shifting elements are held and preferably locked to prevent them from moving out of the neutral position into the gear-engaged position or into one such position when subjected to an actuating force less than a certain minimum actuating force. In the releasing state of the locking device, it is advantageous for the individual assigned gear-shifting element to be released by the application of the minimum actuating force or of an actuating force greater than the minimum actuating force (for example, an actuating force equal to or approximately equal to the maximum actuating force).

An especially preferred embodiment is characterized in that, as a result of the movement of one of the gear-shifting elements from the neutral position into the gear-engaged position or into one such position, a retaining force can be activated or increased which acts on the other or on all the other gear-shifting elements, thus holding it/them in the neutral position. A locking device design of this type is especially resistant to errors, and a corresponding locking device can be realized mechanically in a very simple manner.

We are thinking here in particular that, as a result of the movement of one of the gear-shifting elements from the neutral position into the gear-engaged position or into one such position, a locking engagement which locks the other or all the other gear-shifting elements in the neutral position can be activated or increased.

According to an especially effective embodiment, the locking device comprises a locking element arrangement, which is preferably elastically pretensioned against the gear-shifting elements and engages positively with guide surfaces on the individual gear-shifting elements. The gear-shifting element guide surface can be advantageously designed so that a movement of one of the gear-shifting elements from the neutral position into the gear-engaged position or into one such position causes at least one element of the locking element arrangement to move in such a way that the locking element arrangement is tensioned more strongly against the other or all the other gear-shifting elements. A locking device of this type of particularly simple mechanical design has a spring-loaded plunger arrangement or ball arrangement, which is tensioned between two shaft elements and which engages positively in a recess in the guide surface of the gear-shifting element in question when this element is in the neutral position.

The locking device can have an even simpler mechanical design when formed as one rigid, inelastic locking element, not pretensioned in any way, or based on several such elements. It is proposed in this respect but also in general that the locking device have at least one locking element which is movably supported and dimensioned in such a way that, when the gear-shifting elements are in the neutral position, it is or can be brought into retaining engagement with at least one of the gear-shifting elements, and that any one of the gear-shifting elements can be moved out of the neutral position into the gear-engaged position or into one such position, where, when any one of the gear-shifting elements moves out of the neutral position into the gear-engaged position or into one such position, the gear-shifting element which moves out of the neutral position brings the locking element into retaining engagement with the other gear-shifting element or with all the other gear-shifting elements. The locking element can be, for example, a rigid plunger or pin with no moving parts, or a rigid disk with no moving parts.

It is proposed by way of elaboration that the retaining engagement is a positive engagement between an engaging section, such as an engaging end, of the locking element and an engaging section, such as a recess, in a surface of the associated gear-shifting element.

We are thinking here, for example, that, when the gear-shifting elements are in the neutral position, the locking element (e.g., the previously mentioned pin or plunger) can move in exactly one direction, especially in linear fashion, between a retaining engagement with a first gear-shifting element and a retaining engagement with a second gear-shifting element. In the case of a pin or plunger, the linear movement of the pin or plunger would be in the direction of its longitudinal axis.

As an alternative, it is proposed that, when the gear-shifting elements are in the neutral position, the locking element (e.g., the previously mentioned disk) can move, especially in linear fashion, in several directions between retaining engagements with more than two gear-shifting elements. In the case of a disk, the linear directions of movement will be in the plane of the disk.

As another possibility, it is proposed as being especially preferred that, when the gear-shifting elements are in the neutral position, the locking element can pivot between a retaining engagement with a first and a retaining engagement with a second gear-shifting element. A pivot bearing can be provided at especially low cost and provides a high level of functional reliability.

Insofar as a "retaining engagement" has been mentioned above, what is meant primarily or meant additionally is that, when the gear-shifting elements are in the neutral position, the retaining engagement of the locking element, at least one of which is provided, with an associated gear-shifting element is a nonlocking type of engagement, which can be overcome by the movement of the gear-shifting element in the direction toward the gear-engaged position or into one such position, and that, in the case of a gear-shifting element which has been moved out of the neutral position into the gear-engaged position or into one such position, the retaining engagement of the at least one locking element with the other gear-shifting element or all the other gear-shifting elements is a locking type of engagement which cannot be overcome, at least not by the given actuating forces, and which is locked by the gear-shifting element which has moved out of its neutral position.

Especially short gear-shift times are possible when a gear-engaging actuating force can be applied to one of the gear-shifting elements of the group in the neutral position while the other or one of the other gear-shifting elements of the group is in the gear-engaged position or in one such position, the one gear-shifting element being held in the neutral position by the locking device in opposition to the applied gear-engaging actuating force, wherein, through the movement of the other gear-shifting element from the gear-engaged position into the neutral position under the action of an applied gear-disengaging force, the locking device can be switched to the releasing state in order to allow the one gear-shifting element to move under the action of the applied gear-engaging actuating force out of the neutral position and into the gear-engaged position or into one such position.

In correspondence with conventional designs, the gear-shifting elements can be designed as gear-shift rods. The group or the individual group in question can have two gear-shifting elements (possibly gear-shift rods). The group or each group, however, can also have more than two gear-shifting elements (possibly gear-shift rods). For example, it can have three gear-shifting elements (possibly gear-shift rods).

Especially in the case of a dual-clutch gearbox arrangement or power-shift gearbox arrangement, at least two groups of gear-shifting elements (possibly gear-shift rods), which can be actuated independently of each other, are provided.

We are thinking here in particular of an automatic shifting of the gearbox arrangement. For this purpose, an actuator arrangement assigned to the gear-shifting elements (possibly gear-shift rods) can be provided, by means of which the gear-shifting elements (possibly gear-shift rods) can be actuated in automated fashion.

It is preferable for each of the gear-shifting elements (possibly gear-shift rods) of the group or of at least one group to have at least one actuator assigned to, so that an actuating force which acts in the direction of movement of the gear-shifting elements (possibly gear-shift rods) can be applied simultaneously to each of several gear-shifting elements (possibly gear-shift rods) of the group.

The invention also provides a motor vehicle power train comprising a drive unit (possibly an internal combustion engine), a gearbox arrangement (possibly a dual-clutch gearbox arrangement or a power-shift gearbox arrangement with two groups of gear-shifting elements) according to the invention, and a clutch device (possibly a dual-clutch device with two clutch arrangements, each of which is assigned to its own gearbox input shaft and thus to its own group of gear-shifting elements) for the transmission of torque between the drive unit and the gearbox arrangement.

The invention also provides a process for shifting an inventive gearbox arrangement or the gearbox arrangement of an inventive motor vehicle power train. The inventive process is characterized by a sequence of gear-shifting steps in which a gear-engaging actuating force is applied to one of the gear-shifting elements of the group of gear-shifting elements or of one such group of the elements in the neutral position, while the other gear-shifting element or one of the other gear-shifting elements of the group is in the gear-engaged position or in one such position, wherein the one gear-shifting element is held in the neutral position by the locking device in opposition to the applied gear-engaging actuating force as long as the other gear-shifting element is in the engaged position; and in which a gear-disengaging actuating force is applied to the other gear-shifting element to move the other gear-shifting element out of the gear-engaged position into the neutral position, wherein the locking device is switched to the releasing state by the movement of the other gear-shifting element out of the gear-engaged position into the neutral position, as a result of which the one gear-shifting element is then moved out of the neutral position into the gear-engaged position or into one such position under the action of the applied gear-engaging actuating force. Very short gear-shift times can thus be realized.

By way of elaboration, it is proposed with respect to the shifting of a dual-clutch gearbox arrangement or of a power-shift gearbox arrangement that the shifting sequence comprise a multi-gear shifting of the gearbox arrangement from a starting gear to a target gear several gears away from the starting gear, wherein a gear-shifting element assigned to the starting gear and a gear-shifting element assigned to the target gear both belong to the same group of gear-shifting elements, and wherein the gear-engaging actuating force is applied to the one gear-shifting element and the gear-disengaging force is applied to the other gear-shifting element during the process of shifting from the starting gear to the target gear. The sequence of shifting steps can comprise, for example, a multi-gear downshift, especially a multi-stage downshift. We are thinking here in particular that the sequence of shifting operations will comprise at least one crossover shifting phase and preferably at least two crossover shifting phases between the starting gear or one of the starting gears and a target gear or one of the target gears.

BRIEF DESCRIPTION OF THE DRAWINGS

The invention is explained in greater detail below on the basis of the exemplary embodiments shown in the drawings:

FIG. 8 is a cross-sectional view or side view of a group of two gear-shift rods with a locking element in the form of a double-arm lever cooperating with the two gear-shift rods.

DETAILED DESCRIPTION OF THE PREFERRED EMBODIMENTS

Figure 1:
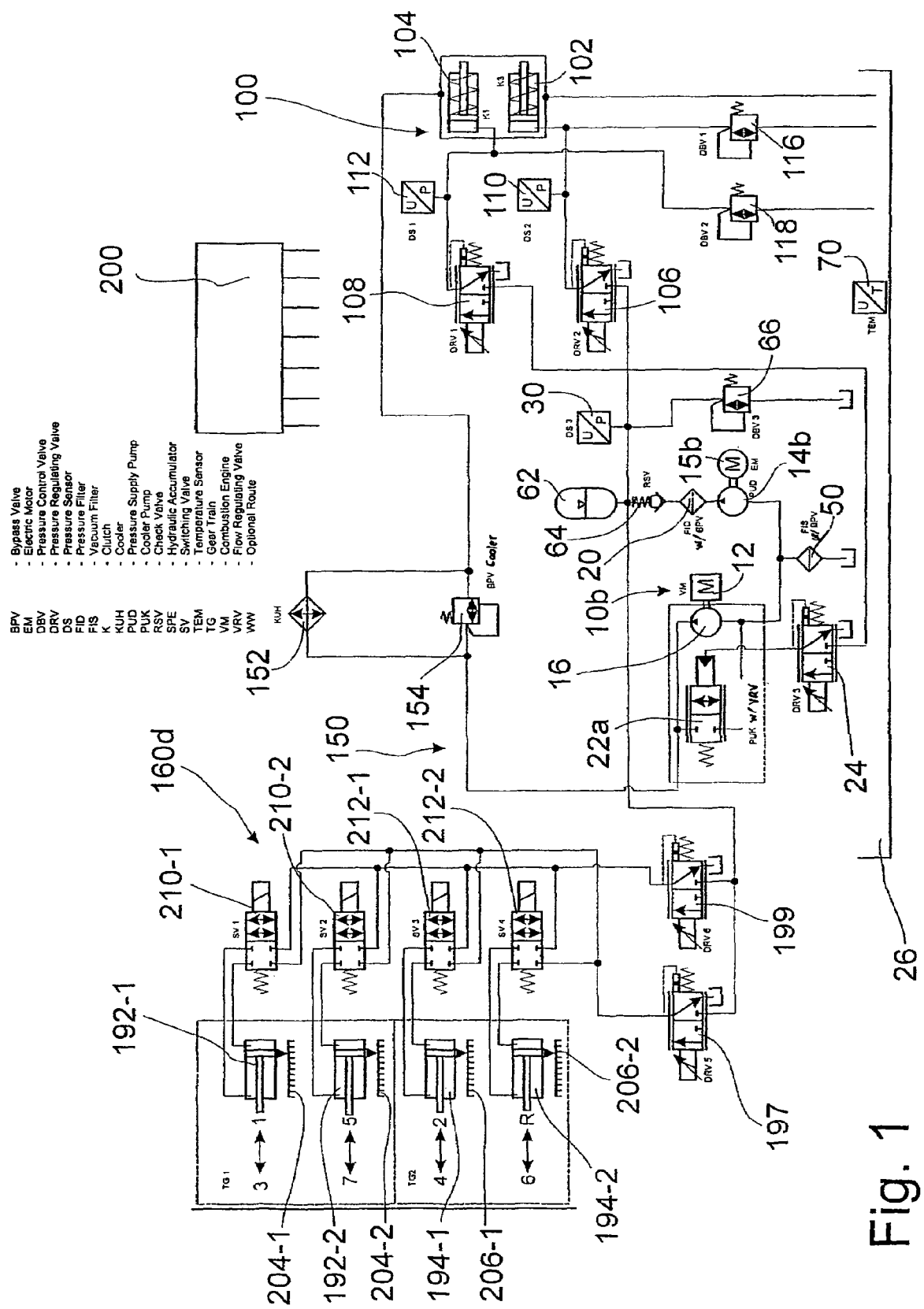
FIG. 1 is a schematic diagram of a hydraulic system assigned to a wet-running, hydraulically actuated dual-clutch device and a hydraulically actuated dual-clutch gearbox, the hydraulic system possibly being part of an inventive power train, with a control unit which drives the operating cylinders of the hydraulic system by the use of various valves.

Except for a different assignment of the gears to the positions of the associated gear-shift rods and the indication of an additional control unit, FIG. 1 corresponds to FIG. 15 of German Patent Application 103 47 203.7, filed on Oct. 10, 2003 and claiming the priorities of the German applications 102 53 658.9 of Nov. 18, 2002; 102 53 663.5 of Nov. 18, 2002; 103 08 296.4 of Feb. 26, 2003; and 103 16 229.1 of Apr. 9, 2003, with the title "Motor Vehicle Power Train with a Pump Arrangement for Supplying a Clutch Device with Pressure Medium and/or Working Medium and/or for Supplying a Gearbox with Pressure Medium, a Corresponding Pump Arrangement, and a Corresponding Actuating Arrangement for Actuating the Gearbox".

According to the exemplary embodiment of FIG. 1, a hydraulically actuated dual clutch 100 is provided with two multi-plate clutch arrangements, which are represented by hydraulic slave cylinders 102, 104, which serve to actuate the associated multi-plate clutch arrangement in the engaging direction. A 3/2-way pressure control valve 106, 108 is assigned to each of the two hydraulic slave cylinders 102, 104 to supply the slave cylinder in question with controlled or regulated pressure oil or pressure. For this purpose, the pressure control valves are connected on the inlet side to the pressure oil delivery side of the pump arrangement 10b, specifically to the pressure oil pump 14b. The oil pressure adjusted by the pressure control valves 106, 108 can be measured by pressure sensors 110, 112, which makes it possible for the clutch to be controlled automatically, which is especially advisable. The pressure sensor 30 serves to detect the input-side pressure at the pressure control valves 106, 108. This pressure is limited to a maximum allowable pressure by the pressure-limiting valve 66, which is connected in parallel to the pressure oil pump 14b. Without limitation on generality, the pressure oil pump 14b can be driven by an electric motor 15b, whereas a pump 16, which supplies cooling oil, can be driven by the internal combustion engine 12 of the power train.

The cooling oil provided by the cooling oil pump 16 is supplied to the dual clutch 100 by way of a cooling oil circuit 150. The cooling oil circuit comprises an oil cooler 152, to which a pressure-limiting valve 154, serving as a bypass valve, is connected in parallel. The volume flow rate of the cooling oil to the dual clutch 100 is adjusted by means of a volume control valve 22a, which is under the pilot control of a pressure control valve 24.

The pressure oil for actuating the gearbox is made available to the gearbox actuating section 160d by the pressure oil pump 14b, which also serves to actuate the clutch. To avoid the danger of a drop in the actuating pressure for the clutch device, it is advisable to provide a hydraulic reservoir in the form of a pressure reservoir 62.

The exemplary embodiment pertains to a seven-gear gearbox (i.e., eight gears, including reverse). The eight gears are divided between two gear trains. The odd gears are realized by a first gear train, the even gears by a second gear train. Each of the two gear trains has two gear-shift rods, each of which has two gear-engaged positions assigned to a corresponding gear and a neutral position between them. All four gear-shift rods of the gearbox, that is, each of the two gear-shift rods of each of the two gear trains, can be actuated by separate, double-acting slave cylinders 192-1 and 192-2 for the first gear train and 194-1 and 194-2 for the second gear train. The pressure for the actuation of the gear-shift rods by means of the previously mentioned double-acting slave cylinders is provided by a 3/2-way pressure control valve 197, preferably designed as a proportional control valve, for shifting in one direction, and by a 3/2-way pressure control valve 199, preferably designed as a proportional control valve, for shifting in the other direction. The four slave cylinders 192-1, 192-2, 194-1, and 194-2 are connected in parallel to the two pressure control valves 197 and 199, each by way of a 4/2-way switching valve 210-1, 210-2, 212-1, and 212-2. These 4/2-way valves have the job of releasing the pressure oil upstream of them, as needed, to whichever cylinder needs to be actuated. All of the cylinders can be moved in the same direction, or they can be actuated individually. In principle, it is possible to chose to move only one individual cylinder or to move several cylinders. If several cylinders are actuated, it is necessary in the case of the circuit realized in FIG. 1 that these cylinders be moved in the same direction. If 4/4-way switching valves, which also have crosswise extending oil channels, are used instead of the 4/2-way switching valves 210-1, 210-2, 212-1, and 212-2, then it is also possible, when several cylinders are to be moved, to subject the cylinders to pressure in such a way that they move in opposite directions. Distance sensors 204-1, 204-2, 206-1, and 206-2 are provided to determine the positions which each of the gear-shift rods has reached at any particular moment.

The various electrically driven valves are under the control of an electronic control unit 200. Additional details of the hydraulic circuit according to FIG. 1 and the purpose of the components shown can be derived by the expert from the symbols and labels shown. Reference can also be made to the content of the previously mentioned German Patent Application 103 47 203.7 or to the patent applications associated with it in terms of priority.

Figure 2:
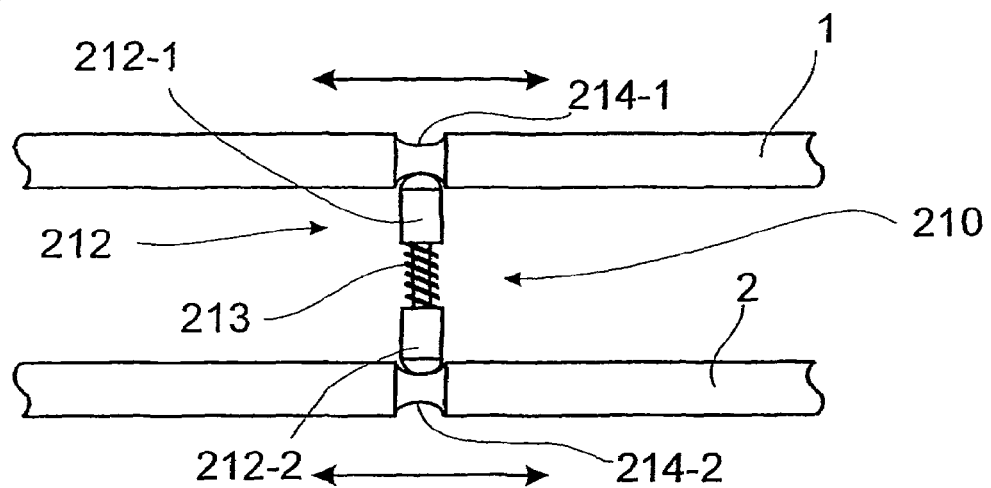
FIGS. 2a and 2b are schematic side views of a group of gear-shift rods and a locking plunger arrangement cooperating with the two gear-shift rods of the group in two different operating states.
Figure 2:
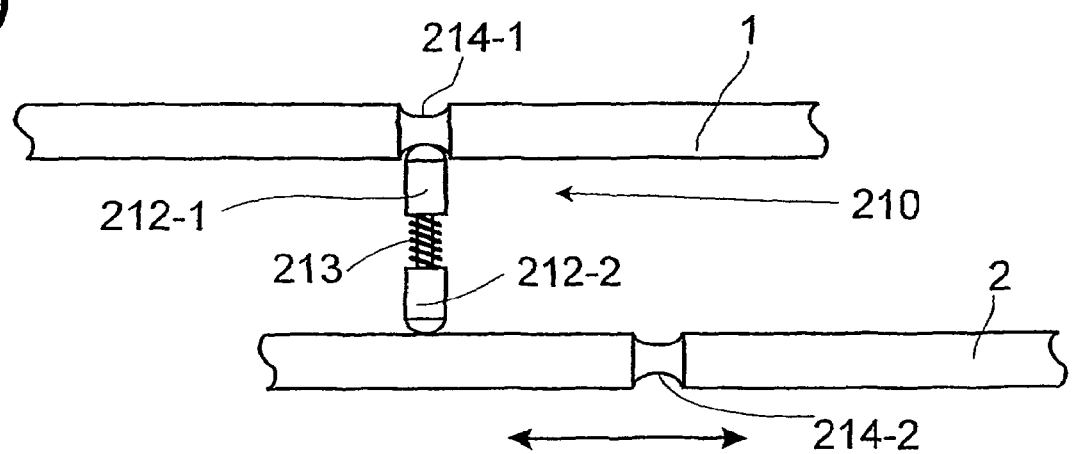

FIG. 2 shows two gear-shift rods 1 and 2 of a gearbox or of a gear train of a gearbox, each of which serves to engage and disengage two gears. According to FIG. 2, the gear-shift rods 1 and 2 are in a neutral position, in which none of the gears assigned to these gear-shift rods is engaged. Either one of the two gears assigned to a gear-shift rod can be engaged by moving the gear-shift rod 1 or 2 axially in the one or the other direction (to the left or right in FIG. 2) into a gear-engaged position.

To prevent two gears of the gearbox or of the gear train from being engaged simultaneously by mistake or as a result of a technical defect, a locking device 210, which is formed by a spring-loaded plunger arrangement 212, is assigned to the two gear-shift rods 1, 2. The plunger arrangement 212 comprises two plungers 212-1 and 212-2 and a helical compression spring 213 installed between them. The spring is guided on a cylindrical section of the plunger 212-1 and spring-loads the two plungers 212-1, 212-2 against the circumference of the gear-shift rods 1 and 2, respectively. When the gear-shift rod in question is in the neutral position, the plunger 212-1 engages in a circumferential groove 214-1 in the gear-shift rod 1 or the plunger 212-2 engages in a circumferential groove 214-2 in the gear-shift rod 2, so that a positive engagement is produced between the plunger arrangement and the associated gear-shift rod. The positive engagement of the plunger in question in the circumferential groove in question can be overcome by an actuating force above a certain force threshold. This force can act on one of the gear-shift rods in the one or the other direction of movement. The circumferential surface of the gear-shift rod in the area of the circumferential groove acts as a cam surface, which, during the axial movement of the gear-shift rod, pushes the plunger toward the other gear-shift rod, that is, in the radial direction toward the other gear-shift rod. It is therefore possible for both gear-shift rods to move in either of the two axial directions shown by the double arrows and thus to move out of the neutral position into whichever one of the two gear-engaged positions has been selected.

According to FIG. 2b, the gear-shift rod 2 has assumed one of its two gear-engaged positions, whereas the gear-shift rod 1 is still in the neutral position. The plunger 212-2 is therefore no longer engaged in the groove 214-2 in the gear-shift rod 2 and is resting instead on a section of the cylindrical surface of the gear-shift rod 2. In comparison with its radial position according to FIG. 2a, the plunger 212-2 has therefore moved closer to the gear-shift rod 1, as a result of which the spring 213 becomes more highly compressed. This means that the plunger 212-1 is being pushed with greater pretensioning force into the groove 214-1 of the gear-shift rod 1. With the given actuating forces, therefore, the gear-shift rod 1 cannot be moved out of its neutral position into one or the other of its two gear-engaged positions. The gear-shift rod 1, according to FIG. 2b, is therefore positively locked in the neutral position. The only movement which is possible in FIG. 2b is the movement of the gear-shift rod 2 toward the neutral position, as indicated by the arrow. The gear-shift rod 1 cannot be moved out of its neutral position until after the gear-shift rod 2 has returned to its neutral position.

It should be pointed out that, proceeding from the state shown in FIG. 2a, with the given actuating forces, the locking device 210 also prevents the two gear-shift rods 1, 2 from moving out of their neutral positions simultaneously, because the shifting forces required to overcome the positive engagement of both plungers in the circumferential grooves are greater than the actuating force required to move only one of the gear-shift rods out of the neutral position.

In reference to the exemplary embodiment according to FIG. 1, the gear-shift rods of the first gear train, which can be actuated by the actuating cylinders 192-1 and 192-2, and the gear-shift rods of the second gear train, which can be actuated by the actuating cylinders 194-1 and 194-2, are designed in the same way as the gear-shift rods 1 and 2 of FIG. 2 and equipped with a locking device 210 corresponding to FIG. 2, that is, with a plunger arrangement corresponding to the plunger arrangement 212. As a result, the locking function which prevents the simultaneous engagement of two gears described in reference to the gear-shift rods 1 and 2 is achieved for the gears of the first gear train and also for the gears of the second gear train.

Figure 3:
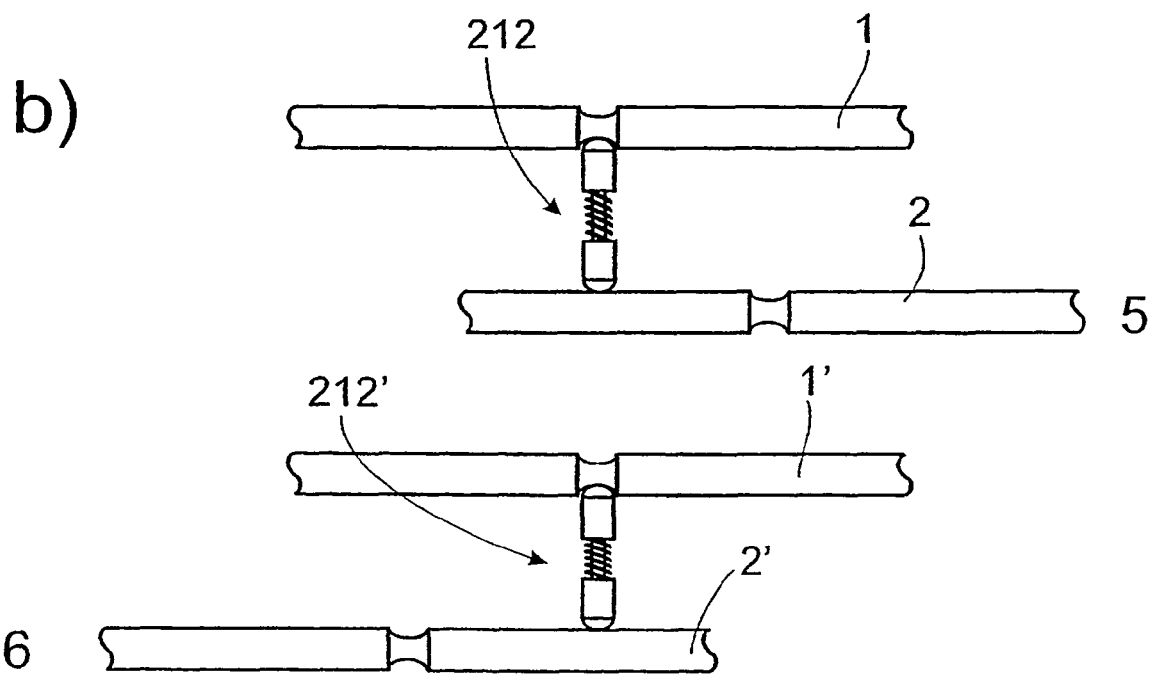
FIGS. 3a, 3b, 3c, and 3d are schematic side views of gear shift rod at various sequences of the states which two groups of gear-shift rods can assume, each group consisting of two rods, during multi-gear downshifting from sixth gear, which is engaged in one gear train, to second gear, which is engaged in the same gear train, with support by means of fifth gear, which is engaged in the other gear train.
Figure 3:
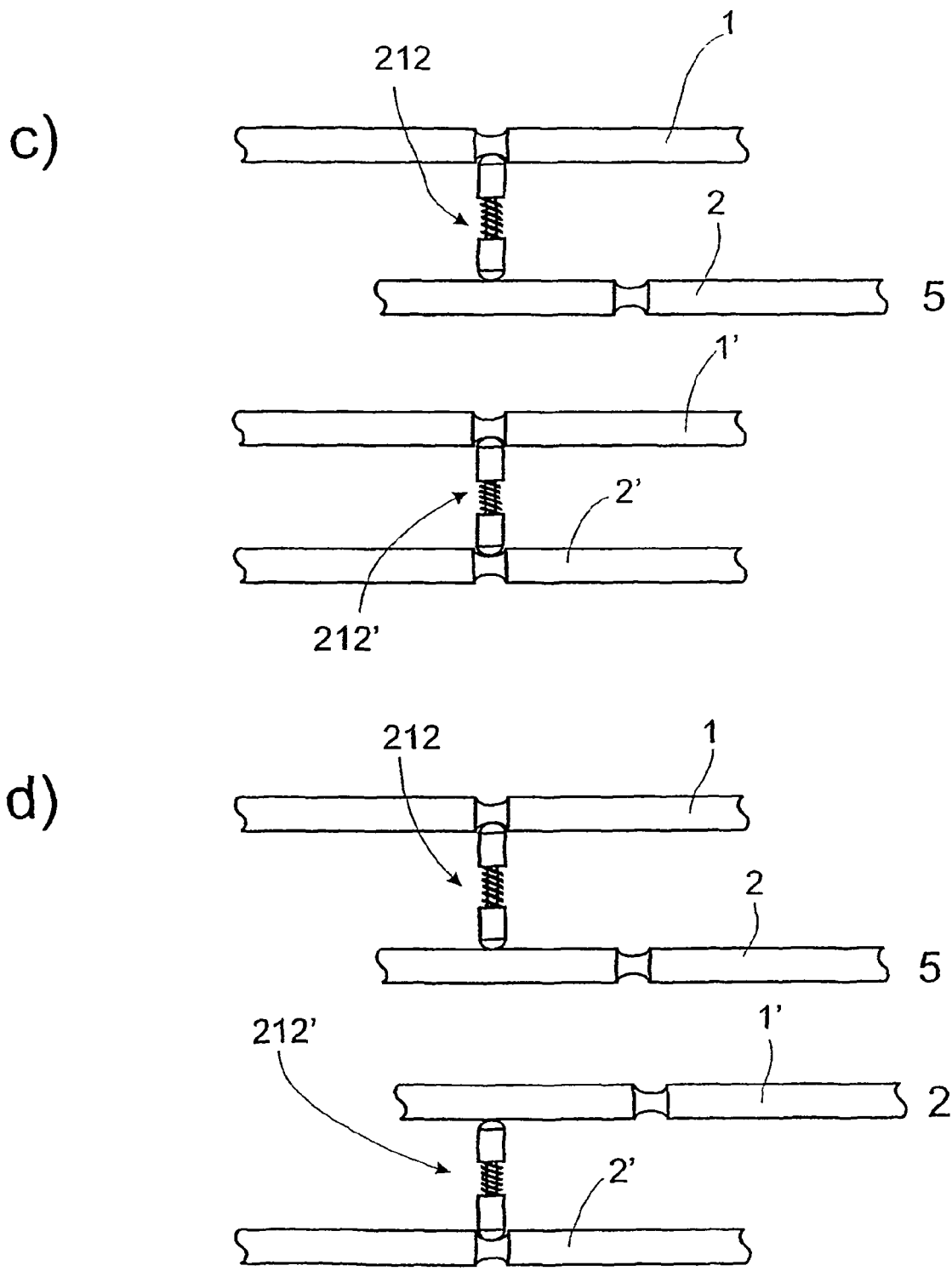
Figure 4:
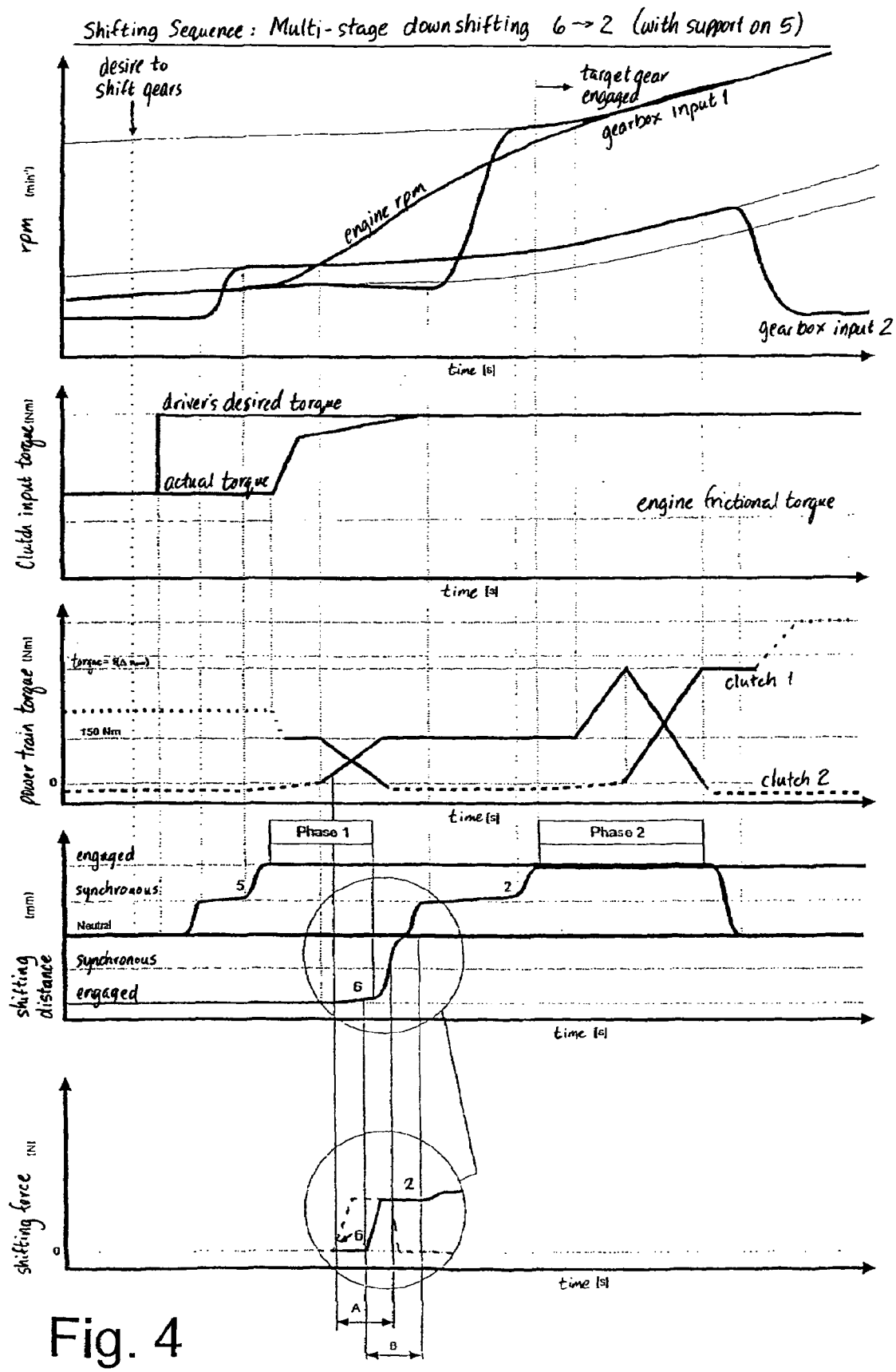
FIG. 4 is a diagram of graphs showing rpm curves, torque curves, shifting distance curves, and shifting force curves as a function of time, for the sequence of shifting steps comprising a multi-stage downshift corresponding to FIG. 3.

With respect to the assignment of gears to the two pairs of gear-shift rods with two rods in each of the two gear trains of the dual-clutch gearbox, the sequence of states according to FIG. 3 refers to the exemplary embodiment of FIG. 1. The gear-shift rods 1 and 2 of the first gear train and the gear-shift rods 1' and 2' of the second gear train are each designed as shown in FIG. 2 and equipped with a plunger arrangement 212, 212', each of which forms a locking device 210, 210' for preventing the simultaneous engagement of two gears in the same gear train. FIG. 3 shows in the subfigures 3a, 3b, 3c, and 3d the sequence of states which occur during a multi-stage downshift from sixth to second gear, with intermediate support on the fifth gear. FIG. 4 shows an example of how this multi-stage downshifting could be executed in detail.

FIG. 3a shows the starting state. Sixth gear is engaged on the gear-shift rod 2' of the second gear train TG2. As can be seen in FIG. 4, to prepare for the multi-stage downshift, fifth gear is first engaged in the other gear train (TG1) (FIG. 3b). On this basis, there follows a first crossover shifting phase, during which the drive torque is transferred from sixth gear to fifth gear without any interruption in the tractive force, in conjunction with or followed by a disengagement of sixth gear by the movement of the gear-shift rod 2' into the neutral position (FIG. 3c) and the movement of the gear-shift rod 1' out of the neutral position into the gear-engaged position assigned to second gear (FIG. 3d). On the basis of the engagement of both second and fifth gears, there then follows a second crossover shifting phase, during which the drive torque is transferred from fifth gear to second gear without any interruption in the tractive force.

Multi-gear shifting is to be considered highly time-critical, at least if a sports car-like driving behavior is desired. In the example of multi-stage downshifting as discussed here from sixth gear to second gear with support on the fifth gear, there are two phases during which two gears are engaged simultaneously. In between, one gear (sixth gear) should be disengaged and the other gear engaged (second gear) as quickly as possible in the same gear train.

The inventive locking device, i.e., the plunger arrangement 212, 212' in the present example, makes it possible, in preparation for the engagement of the target gear, for the shifting actuator in question to exert a pretensioning force, acting in the direction toward the desired gear-engaged position, onto the gear-shift rod assigned to the target gear while the starting gear in the same gear train is still engaged, since the locking device prevents the target gear from being engaged prematurely, that is, before the starting gear is disengaged. Only after the gear-shift rod assigned to the starting gear has returned to the neutral position is the other gear-shift rod released by the locking device and moved under the action of the applied pretensioning force out of the neutral position into the gear-engaged position assigned to the target gear. In the example discussed in association with FIGS. 3 and 4, this early pretensioning of the gear-shift rod 1' assigned to the target gear (second gear) is taken advantage of to minimize the time required for the multi-stage downshift. As can be seen in FIG. 4, the two lower diagrams show the shifting distances traveled by the gear-shift rods together with an indication of their positions, i.e., "engaged", "synchronous", "neutral", "synchronous", and "engaged", and the shifting force curves required to disengage sixth gear and to engage second gear. The two circled areas of the graphs are of particular interest with respect to the disengagement of sixth gear and the engagement of second gear. The application of a pretensioning force for the disengagement of sixth gear takes place during the time interval indicated in FIG. 4 by the double arrow A, and the application of a pretensioning force for engaging second gear takes place during the time interval identified in FIG. 4 by the double arrow B. The time at which the disengagement of sixth gear begins is determined by the crossover shifting of the clutch and thus depends on the clutch crossover time. The time at which the engagement of second gear begins depends on when sixth gear reaches the disengaged (neutral) state. Because of this dependence on the disengagement of sixth gear, the time at which the engagement of second gear begins thus also depends on the crossover shifting of the clutch, i.e., on the clutch crossover time.

According to what has been said above, the shifting actuator for disengaging the starting gear (sixth gear in the present example) is pretensioned during clutch crossover (phase 1). This pretensioning force is to be selected as a function of, among other things, the clutch supporting torque (the torque transmitted by the clutch) and the gear to be disengaged. Once the clutch or clutch arrangement of the dual clutch assigned to the starting gear is released, the disengagement of the starting gear begins as soon as the applied disengaging force is greater than the retaining force holding the gear, this retaining force being itself the result of the applied clutch torque and the existing frictional forces. At the same time or possibly even beforehand, a pretensioning force can be applied to the other gear-shift rod assigned to the target gear in the same gear train in the direction toward the gear-engaged position for the target gear. As a result of the inventive locking device, the target gear to be engaged is not engaged before the starting gear is disengaged, i.e., before the gear-shift rod in question has therefore returned to the neutral position. It should be pointed out in reference to FIG. 3 that FIG. 3c represents only a stop-action view of a single moment of the shifting sequence according to FIG. 4, not a stationary state. Because of the pretension applied in advance to the gear-shift rod 1', the movement of the gear-shift rod 1' toward the gear-engaged position assigned to fifth gear begins more or less at the same moment that the gear-shift rod 2' reaches the neutral position. The movement of the gear-shift rod 2' out of the gear-engaged position assigned to the starting gear 6 into the neutral position and the movement of the gear-shift rod 1' out of the neutral position into the gear-engaged position assigned to the target gear (second gear) therefore occur in a single stroke.

The possibility of parallel activation of the gearshift actuating mechanisms provided according to the invention makes it possible to achieve the best possible shifting performance at the maximum possible speed. As a result of the inventive locking device, especially the mechanical locking of the gear-shift rods as in the case of the exemplary embodiment, the gearbox is, or the gearboxes are, protected from the possibility that two gears could be engaged at the same time. Even if the gear-shift rod assigned to the target gear is actuated incorrectly, the target gear cannot be engaged in the gear train as long as the starting gear remains engaged.

Figure 5:
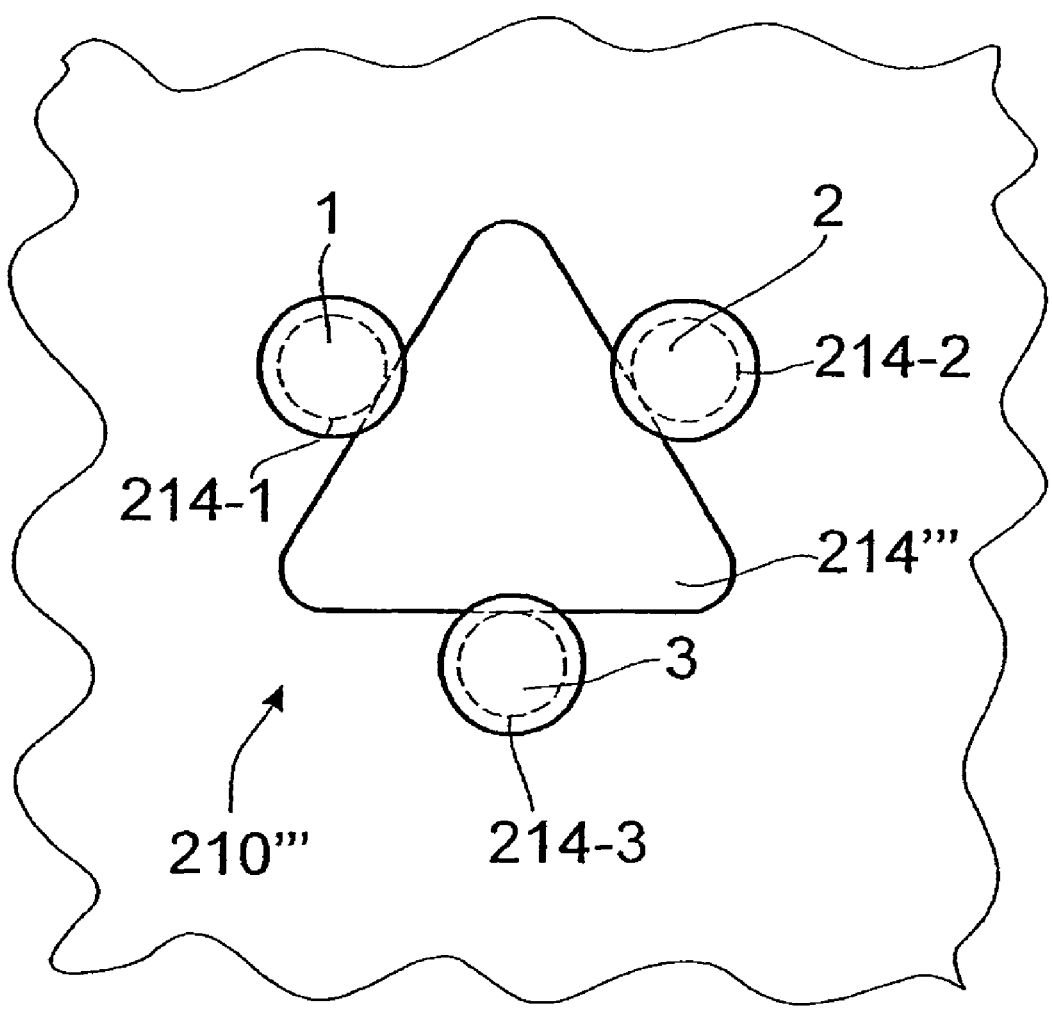
FIG. 5 is a schematic cross-sectional view example of a group of three gear-shift rods with a disk-like locking element of elastic material jointly assigned to the gear-shift rods.

The invention can be applied in a corresponding manner to gearboxes or gear trains with more than two gear-shift rods. FIG. 5 shows an example with three gear-shift rods 1, 2, and 3, to which a locking device 210''' in the form of an element made of elastic material is assigned in common, this element appearing more or less in the form of a triangle when viewed from above as in FIG. 5. The element 214''' has three engaging edges, each of which fits into a circumferential groove 214-1, 214-2, and 214-3 of the gear-shift rod 1, 2, and 3 in question when the gear-shift rod is in the neutral position. This is the position shown in FIG. 5. One of the gear-shift rods can move into one of its gear-engaged positions by pushing the element 214''' out of the circumferential groove of the gear-shift rod in question by a type of cam interaction between the circumferential surface of the gear-shift rod in the area of the circumferential groove and the edge of the element 214'''. As a result, the element 214''' is pushed into even stronger engagement with the circumferential grooves in the other two gear-shift rods, so that these are now prevented from moving into one of their gear-engaged positions as long as the gear-shift rod which has left the neutral position has not returned to the neutral position.

The design of the locking element or of the locking elements according to FIGS. 2-5 as elements with intrinsic elasticity or as spring-loaded elements is not mandatory. If suitable dimensions are chosen, it is also possible to use completely stiff, rigid and therefore inelastic elements, which are not subject to any pretension, to prevent a gear-shifting element from moving out of the neutral position into the one or the other gear-engaged position when it is not supposed to.

Figure 6:
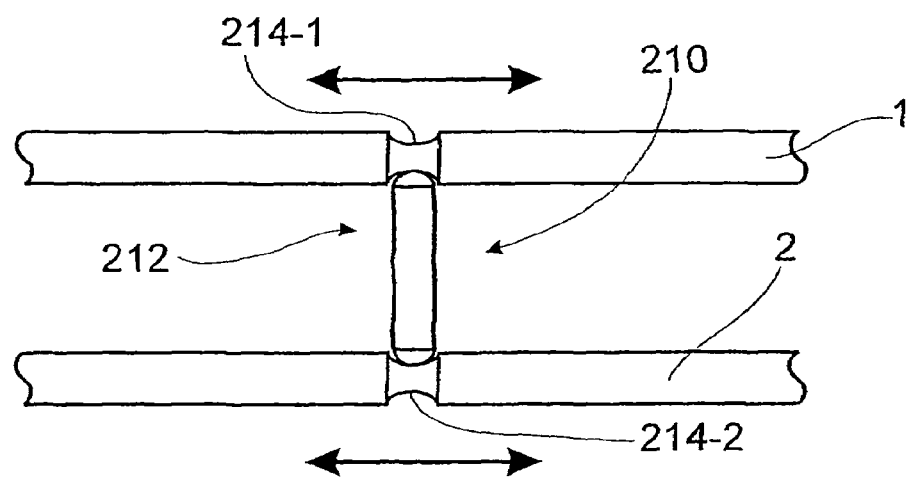
FIGS. 6a and 6b are side views corresponding to FIGS. 2a and 2b of a modification of the locking plunger arrangement cooperating with the gear-shift rods, namely, a rigid plunger not under any pretension, which can be considered also for the exemplary embodiment of FIG. 3.
Figure 6:
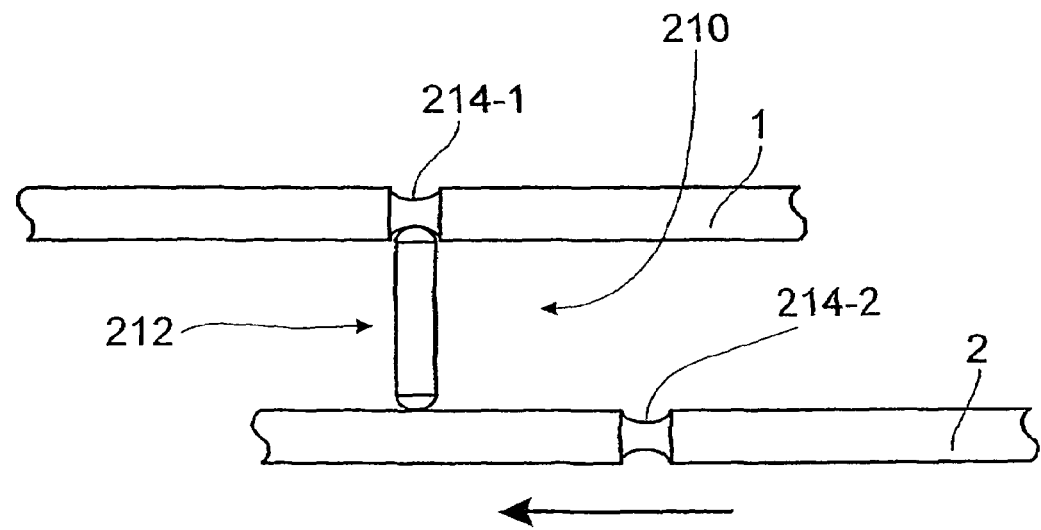

FIG. 6 shows a solution in which, in place of the plunger arrangement 212 according to FIG. 2, a simple, rigid plunger 212 is provided, the engaging end of which can be brought into engagement with the circumferential groove 214-1 of the gear-shift rod 1 or with the circumferential groove 214-2 of the gear-shift rod 2. If the engaging end of the plunger 212 is located in one of the circumferential grooves, then the other engaging end of the plunger is at a point located just outside the circumferential groove in the other gear-shift rod, which means that the other gear-shift rod is able to move freely. In the case of FIG. 6*a*, the gear-shift rod 1 is able to move freely, not being hindered by the engaging end of the plunger 212, i.e., by the end facing away from gear-shift rod 2. The gear-shift rod in the circumferential groove of which the plunger 212 is engaged, i.e., gear-shift rod 2 in the case of the example according to FIG. 6*a*, is also able to move freely, as long as the two gear-shift rods are in the neutral position. Movement of the gear-shift rod 2, however, has the effect of pushing the plunger 212 toward the other gear-shift rod (i.e., toward gear-shift rod 1 in the example according to FIG. 6*a*) by contact with the circumferential surface of the gear-shift rod in the area of the circumferential groove. The plunger 212 is just long enough to fit between the circumferential surface of the gear-shift rod which has been pushed out of the neutral position and the circumferential surface inside the circumferential groove of the gear-shift rod which is in the neutral position, as shown in FIG. 6*b*. Gear-shift rod 2 has been moved out of the neutral position here, and gear-shift rod 1 is now held by the plunger 212 in the neutral position, because the plunger 212, as a result of its contact with the outer circumference of the gear-shift rod 2, cannot be pushed out of the circumferential groove 214-1. Plungers according to plunger 212 in FIG. 6 could also be used for several pairs of gear-shift rods according to FIG. 3 in place of the plunger arrangements 212 and 212' shown there.

Figure 7:
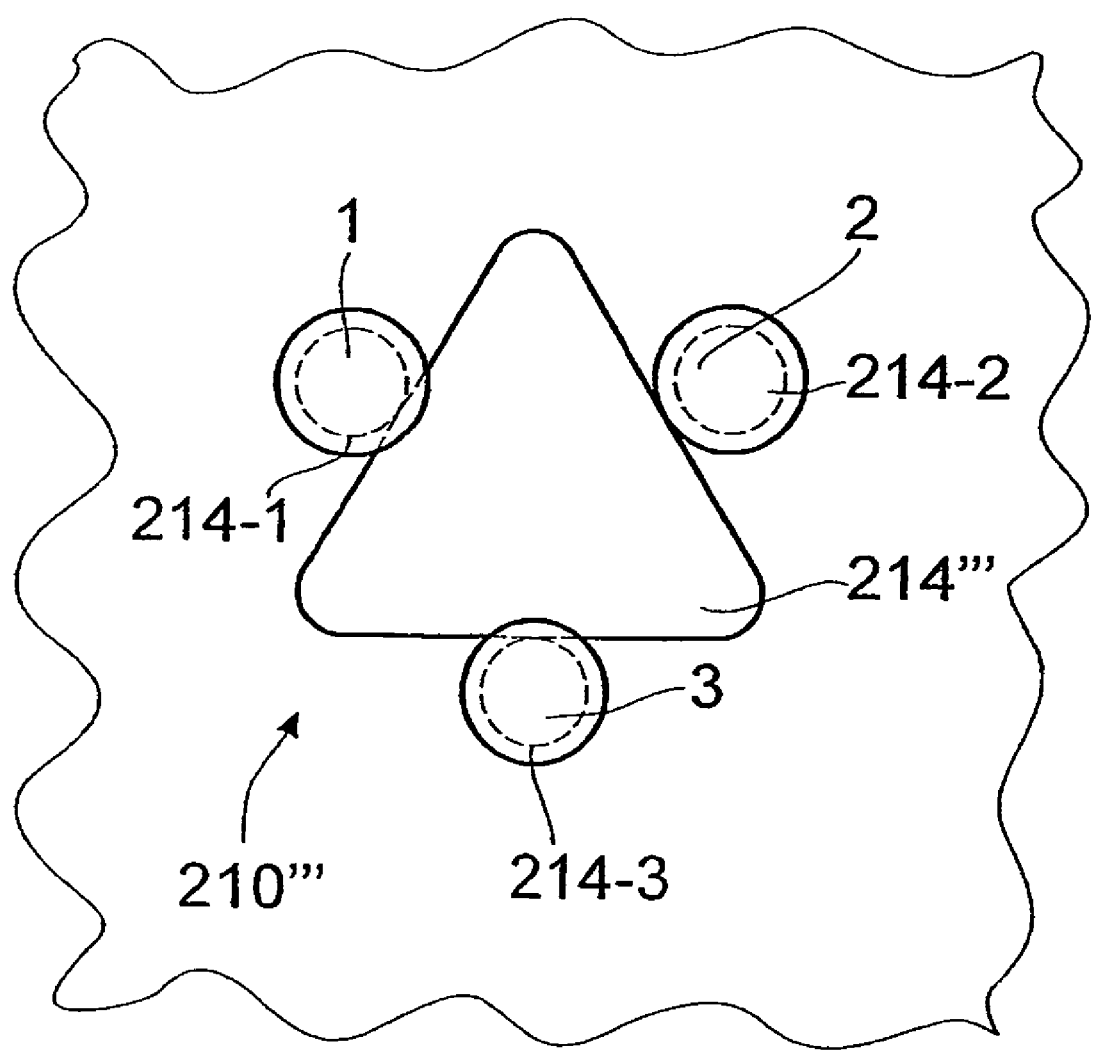
FIG. 7 is a schematic cross-sectional view corresponding to FIG. 6 of a modification of the disk-like locking element, namely, a rigid, inelastic embodiment of the disk-like locking element.

A stiff, rigid locking element could also be used when more than two gear-shift rods are present. FIG. 7 shows a corresponding example. In place of the element according to FIG. 5 made of elastic material, a similarly shaped but somewhat smaller, rigid disk element 214''' is provided, which is dimensioned in such a way that it is not quite large enough to fit into the circumferential groove of one of the gear-shift rods when it is engaged by the maximum amount in the grooves of the other two gear-shift rods. If we assume that, according to FIG. 7, not only gear-shift rods 1 and 3 but also gear-shift rod 2 are in the neutral position, any of the three gear-shift rods can be pushed out of the neutral position into a gear-engaged position. After that, the gear-shift rods remaining in the neutral position are locked in the neutral position by the locking element, because the locking element has nowhere to go and thus cannot be pushed out of the circumferential grooves in question. If we assume that, according to FIG. 7, gear-shift rod 2 is in a gear-engaged position, gear-shift rods 1 and 3 are prevented from moving out of the neutral position.

It is also possible to imagine completely different types of locking elements and completely different ways in which the at least one locking element can move. FIG. 8 shows an example in which a locking device according to the invention is in the form of a two-armed lever 302, which is supported pivotably on a pivot bearing 304. Each of the two lever arms 306*a* and 306*b* has an engaging end 308*a*, 308*b* with an engaging edge, which points more or less tangentially in the pivoting direction, and which, when gear-shift rods 1 and 2 are in the neutral position, can engage completely either in the circumferential groove 214-1 of gear-shift rod 1 (gear-shift rod 2 then being released) or in the circumferential groove 214-2 of the other gear-shift rod 2 (gear-shift rod 1 then being released). According to FIG. 8, the engaging edge 308*b* of the lever arm 306*b* shown at the bottom can engage in the circumferential groove 214-2 of the gear-shift rod 2. Gear-shift rod 1 can then be moved out of the neutral position. Alternatively, gear-shift rod 2 could also be moved out of the neutral position, when the double-arm lever 302 is pivoted until the engaging edge 308*a* of the other lever arm 306*a* engages in the circumferential groove 214-1 of the gear-shift rod 1. When one of the gear-shift rods is moved out of the neutral position, the other gear-shift rod is locked by the engaging edge of the associated lever arm and thus prevented from moving out of the neutral position. In place of a double-armed lever, it would also be possible to use other types of pivoting or rocking elements.

What is claimed is:

1. A gearbox arrangement for a power train of a motor vehicle, comprising:
   a housing;
   at least one group of gear-shifting elements designed to engage and to disengage at least one gear of the gearbox arrangement by moving relative to the housing between, at least one gear-engaged position, in which one gear assigned to the gear-shifting element is engaged, and at least one neutral position, in which said gear is disengaged; and
   at least one locking device configured for locking and releasing the gear-shifting elements, the locking device being designed to be in a releasing state when all of the gear-shifting elements are in the neutral positions, and being designed to be in a locking state when one of the gear-shifting elements of the at least one group is in the respective gear-engaged position, wherein the locking device, when in the locking state, prevents other ones of the gear-shifting elements of the group from moving out of the neutral position into their respective gear-engaged positions.

2. The gearbox arrangement of claim 1, wherein the locking device, when in the releasing state, allows any one of the gear-shifting elements to move out of the neutral position into the respective gear-engaged position.

3. The gearbox arrangement of claim 1, wherein the locking device, when in the releasing state, allows the gear-shifting elements to move out of the neutral position into the respective gear-engaged position such that only one of the gear-shifting elements can move into the respective gear-engaged position at a time.

4. The gearbox arrangement of claim 1, wherein the locking device, when in the locking state, prevents each of the other ones of the gear-shifting elements from moving out of the neutral position into the respective gear-engaged position when a given maximum actuating force is exerted on the each of the other ones of the gear-shifting elements.

5. The gearbox arrangement of claim 1, wherein the locking device, when in the releasing state, prevents the gear-shifting elements from moving out of the neutral position into the respective gear-engaged position when an actuating force exerted on at least one of the gear-shifting elements is below a minimum actuating force.

6. The gearbox arrangement of claim 5, wherein the locking device, when in the releasing state, retains the gear-shifting elements to prevent them from moving out of the neutral position when an actuating force exerted on at least one of the gear-shifting elements is below the minimum actuating force.

7. The gearbox arrangement of claim 6, wherein the locking device, when in the releasing state, exerts a first retaining force on the gear-shifting elements which first retaining force is overcome when at least the minimum actuating force is exerted on at least one of the gear-shifting elements.

8. The gearbox arrangement of claim 7, wherein the locking device, when in the locking state upon movement of the one of the gear-shifting elements out of the neutral position into the respective gear-engaged position, exerts a second retaining force on the other ones of the gear-shifting elements, the second retaining force being larger than the first retaining force.

9. The gearbox arrangement of claim 1, wherein the locking device, upon movement of the one of the gear-shifting elements from the neutral position into the respective gear-engaged position, has a locking engagement with the at least one other gear-shifting element in the neutral position.

10. The gearbox arrangement of claim 1, wherein said gear-shifting elements include guide surfaces, the locking device comprises a locking element arrangement elastically pretensioned against and acting positively on the guide surfaces of each of the gear-shifting elements, the guide surfaces of the gear-shifting elements being designed in such a way that a movement of one of the gear-shifting elements from the neutral position into the respective gear-engaged position causes at least one element of the locking device to move, such that the locking device is urged more strongly against the other ones of the gear-shifting elements in response to the movement of the at least one element of the locking device.

11. The gearbox arrangement of claim 10, wherein the locking device comprises a spring-loaded plunger arrangement or ball arrangement installed under tension between two gear-shifting elements, and the guide surface of each of the gear-shifting elements comprises a recess, the plunger or ball arrangement engaging positively in the recess of at least one gear-shifting element when the at least one gear-shifting element is in the neutral position.

12. The gearbox arrangement of claim 1, wherein the locking device has at least one movably supported locking element arranged and dimensioned such that, when the gear-shifting elements are in the neutral position, the locking element is in a first retaining engagement with at least one of the gear-shifting elements and any of the gear-shifting elements are movable from the neutral position into the respective gear-engaged position, and wherein the locking element, after any one of the gear-shifting elements has moved out of the neutral position into the respective gear-engaged position, is in a second retaining engagement with the other ones of the gear-shifting elements, the second retaining engagement being effected by the gear-shifting element which has moved out of the neutral position.

13. The gearbox arrangement of claim 12, wherein the locking element comprises an engaging end and the gear-shifting element comprises a recess, the second retaining engagement being a positive engagement between the engaging end and the recess.

14. The gearbox arrangement of claim 12, wherein, when the gear-shifting elements are in the neutral position, the locking element is movable linearly in a single direction between a first gear-shifting element and a second gear-shifting element.

15. The gearbox arrangement of claim 12, wherein, when the gear-shifting elements are in the neutral position, the locking element is movable linearly in several directions between more than two gear-shifting elements.

16. The gearbox arrangement of claim 12, wherein, when the gear-shifting elements are in the neutral position, the locking element is pivotably arranged between a first gear-shifting element and a second gear-shifting element.

17. The gearbox arrangement of claim 12, wherein, when the gear-shifting elements are in the neutral position, the first retaining engagement of the locking element with the gear-shifting element is a nonlocking engagement, which can be overcome by a movement of the gear-shifting element toward the respective gear-engaged position, and wherein, after a gear-shifting element has been moved out of the neutral position into the respective gear-engaged position, the second retaining engagement of the locking element with the at least one other gear-shifting element is a locking engagement, which cannot be overcome by actuating forces, the locking type of engagement being effected by the gear-shifting element which has been moved out of the neutral position.

18. The gearbox arrangement of claim 1, wherein the locking device retains one of the other ones of the gear-shifting elements in the neutral position against an applied gear-engaging actuating force, and wherein, as a result of the movement of the one of the gear-shifting elements from the respective gear-engaged position into the neutral position upon exertion of a gear-disengaging actuating force, the locking device is movable into the releasing state, so that the one of the other ones of the gear-shifting elements is movable out of the neutral position into the respective gear-engaged position upon exertion of the gear-engaging actuating force.

19. The gearbox arrangement of claim 1, wherein the gear-shifting elements are gear-shift rods.

20. The gearbox arrangement of claim 1, wherein the group has two gear-shifting elements.

21. The gearbox arrangement of claim 1, wherein the group has more than two gear-shifting elements.

22. The gearbox arrangement of claim 1, comprising at least two independently actuatable groups of gear-shifting elements.

23. The gearbox arrangement of claim 1, further comprising actuator arrangements assigned to the gear-shifting elements, so that the gear-shifting elements are actuatable automatically.

24. The gearbox arrangement of claim 23, wherein each gear-shifting element has at least one actuator arrangement, so that an actuating force acting in the direction of movement of the gear-shifting elements can be applied to several gear-shifting elements of the group simultaneously.

25. A motor vehicle power train comprising:
a drive unit;
a gearbox arrangement comprising:
a housing;
at least one group of gear-shifting elements designed to engage and to disengage at least one gear of the gearbox arrangement by moving relative to the housing between, at least one gear-engaged position, in which one gear assigned to the gear-shifting element is engaged, and at least one neutral position, in which said gear is disengaged; and
at least one locking device configured for locking and releasing the gear-shifting elements, the locking device being designed to be in a releasing state when all of the gear-shifting elements are in the neutral positions, and being designed to be in a locking state when one of the gear-shifting elements of the at least one group is in the respective gear-engaged position, wherein the locking device, when in the locking state, prevents other ones of the gear-shifting elements of the group from moving out of the neutral position into their respective gear-engaged positions.

26. A process for shifting gears of a gearbox arrangement which comprises a housing; at least one group of gear-shifting elements designed to engage and to disengage at least one gear of the gearbox arrangement by moving relative to the housing between at least one gear-engaged position, in which one gear assigned to the gear-shifting element is engaged, and at least one neutral position, in which said gear is disengaged; and at least one locking device configured for locking and releasing the gear-shifting elements, the locking device being designed to be in a releasing state when all of the gear-shifting elements are in the neutral positions, and being designed to be in a locking state when one of the gear-shifting elements of the at least one group is in the respective gear-engaged position, wherein the locking device, when in the locking state, prevents other ones of the gear-shifting elements of the group from moving out of the neutral position into their respective gear-engaged positions, the process including a gear-shift sequence with the steps of:
providing at least one gear-shifting element which is in the neutral position, and one other gear-shifting element which is in the respective gear-engaged position;
applying a gear-engaging actuating force to the at least one gear-shifting element which is in the neutral position;
retaining the at least one gear-shifting element in the neutral position by the locking device which is in the locking state, thereby preventing the at least one gear-shifting element from being moved by the applied gear-engaging actuating force as long as the other gear-shifting element is in the respective gear-engaged position;
applying a gear-disengaging force to the one other gear-shifting element thereby moving the one other gear-shifting element out of the respective gear-engaged position into the neutral position;
moving the locking device into the releasing state as a result of the step of moving the one other gear-shifting element out of the respective gear-engaged position into the neutral position; and
moving the at least one gear-shifting element under the action of the applied gear-engaging force out of the neutral position into the respective gear-engaged position.

27. The process of claim 26 designed for multi-gear shifting of the gearbox arrangement from a starting gear to a target gear and further comprising:
assigning a first gear-shifting element to the starting gear;
assigning a second gear-shifting element to the target gear, the gear-shifting elements assigned to the starting gear and to the target gear belonging to the same group of gear-shifting elements;
wherein the step of applying the gear-engaging actuating force comprises applying the gear-engaging actuating force to the second gear-shifting element, and wherein the step of applying the gear-disengaging actuating force comprises applying the gear-disengaging actuating force to the first gear-shifting element.

28. The process of claim 27, wherein the gear-shift sequence is a multi-gear downshift.

29. The process of claim 27, wherein the gear-shift sequence comprises at least one crossover shifting phase between the starting gear and the target gear.

* * * * *